March 11, 1969 W. L. CHAMBERS 3,432,702
BATTERY POWERED ELECTRIC KNIFE
Filed Aug. 24, 1966 Sheet 3 of 6
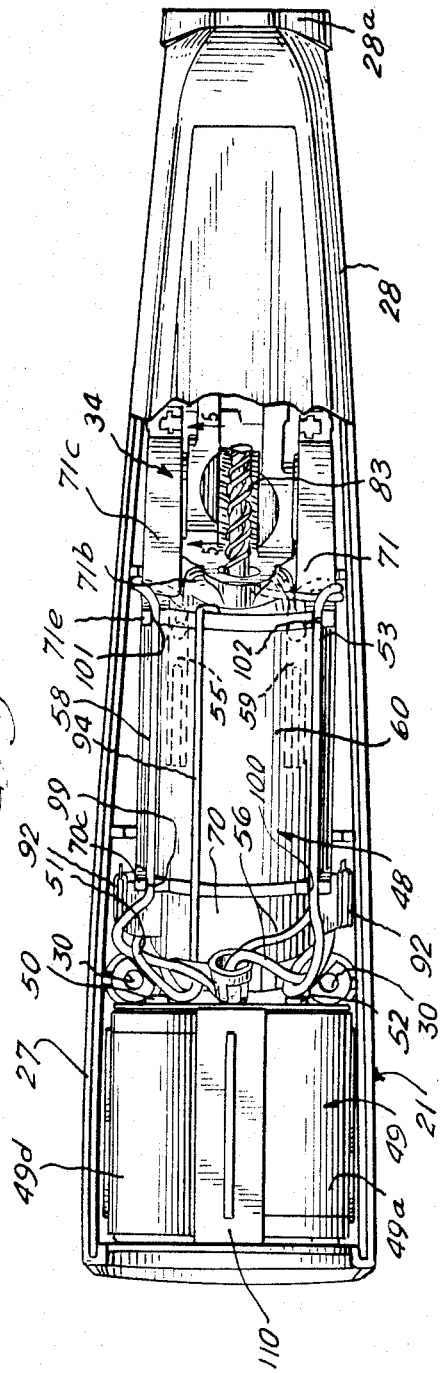
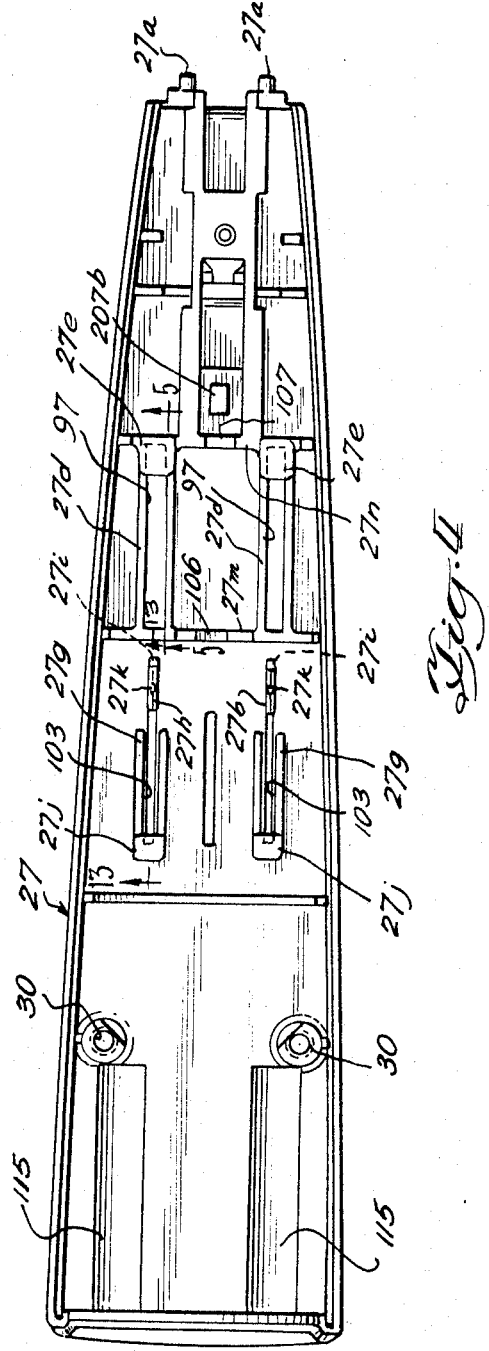
INVENTOR
Worthy L. Chambers
By George R. Clark

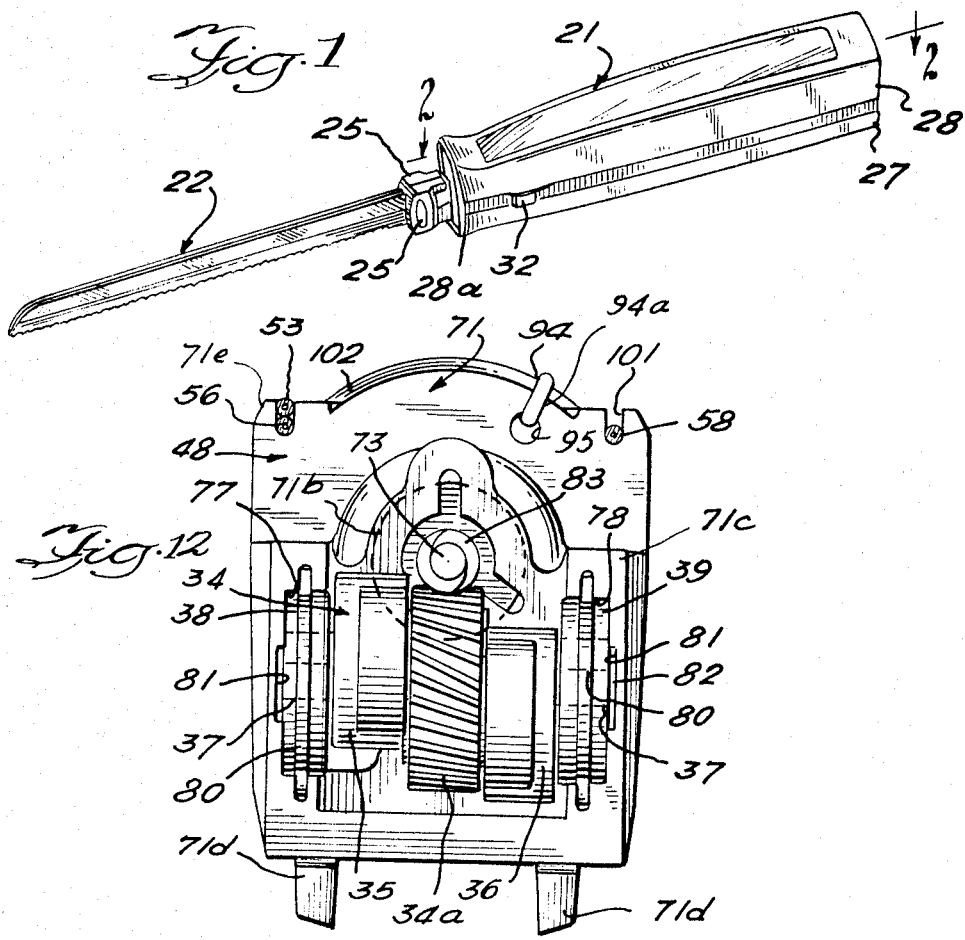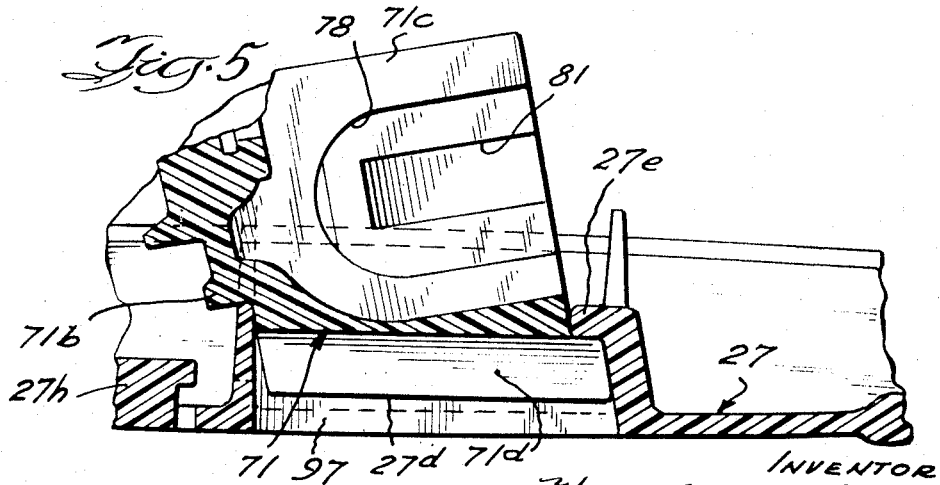

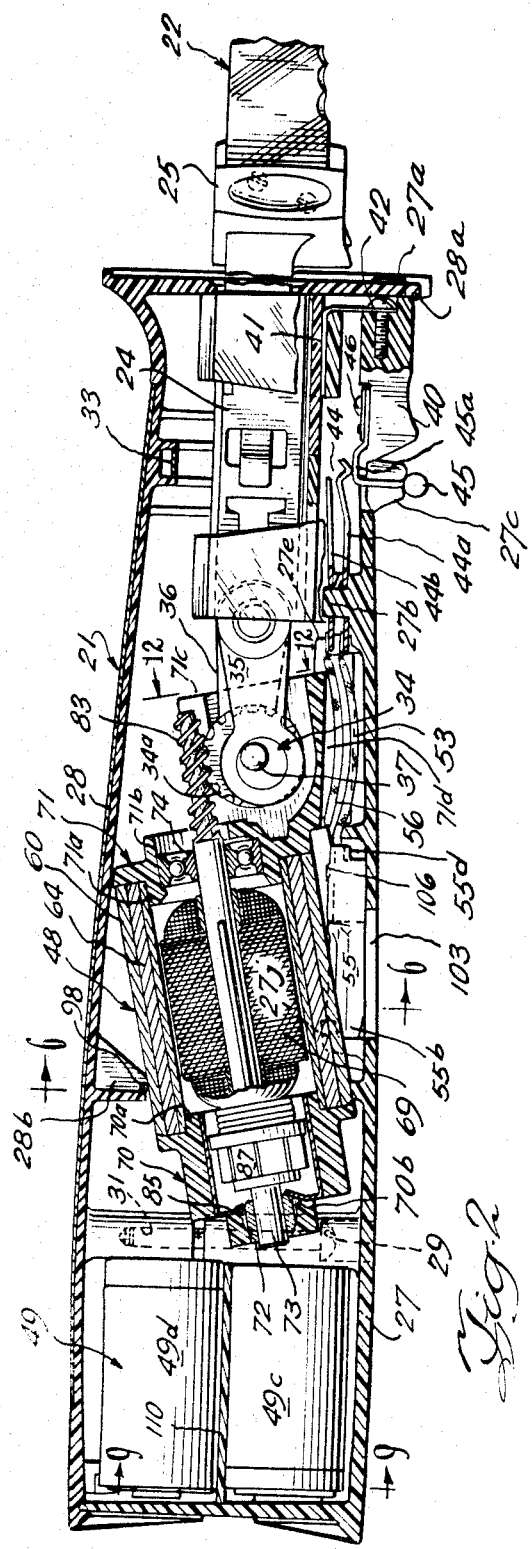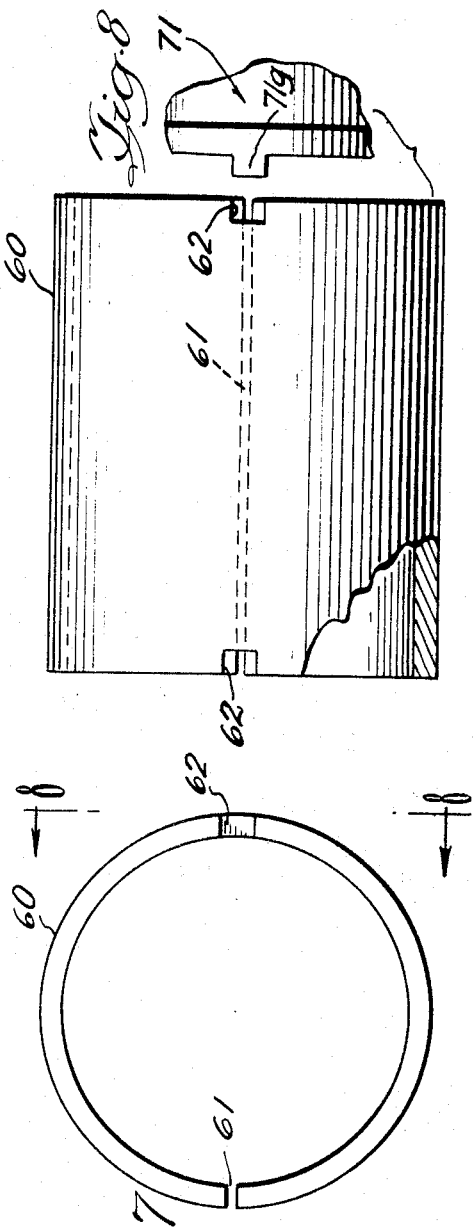

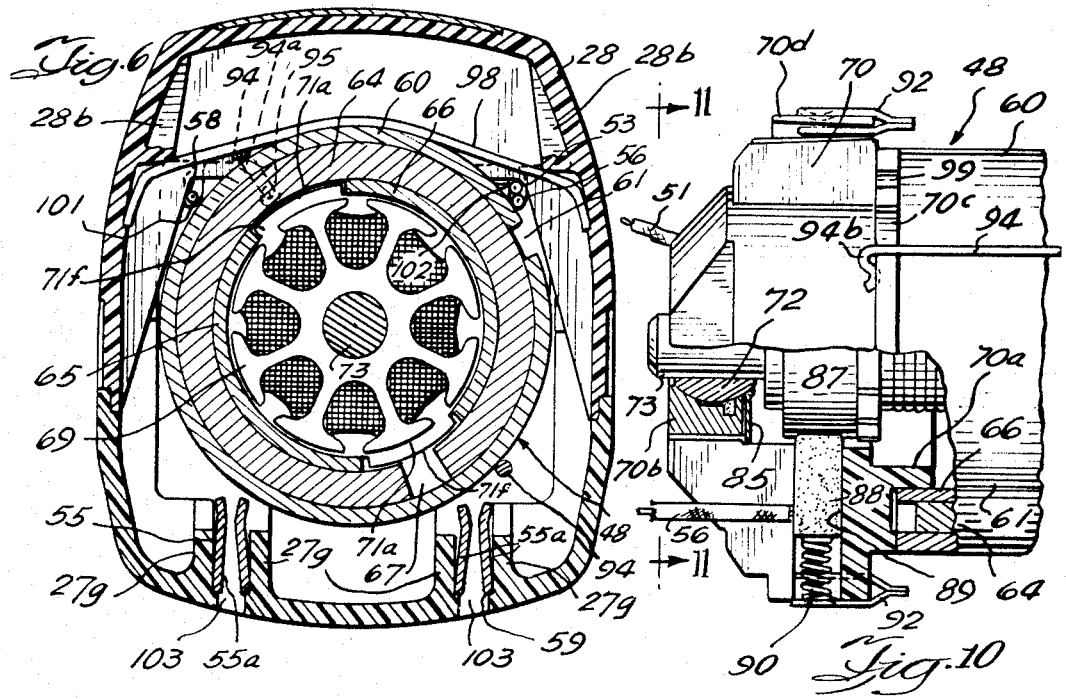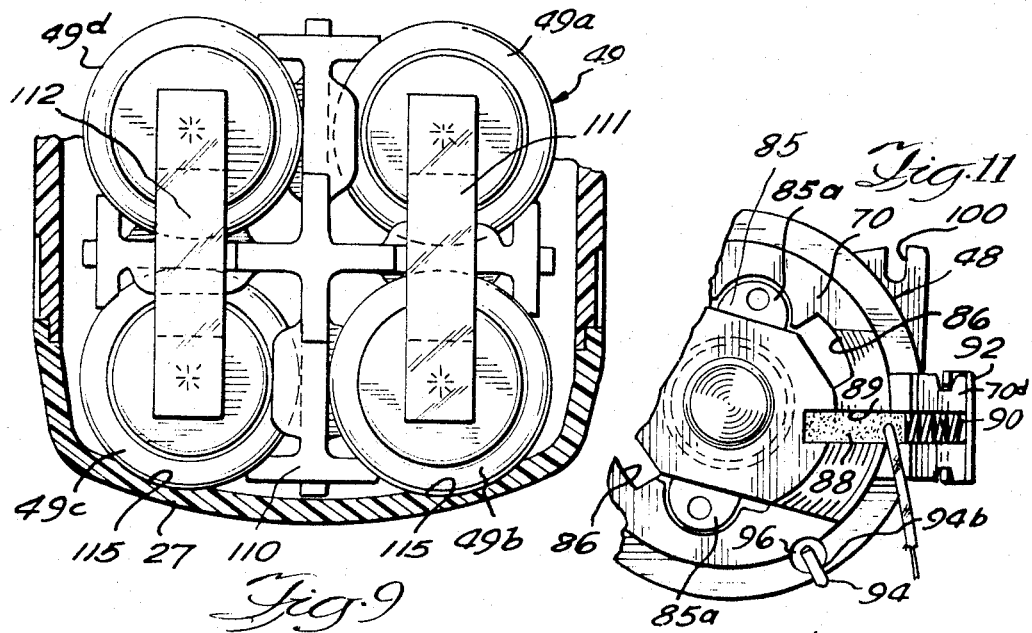

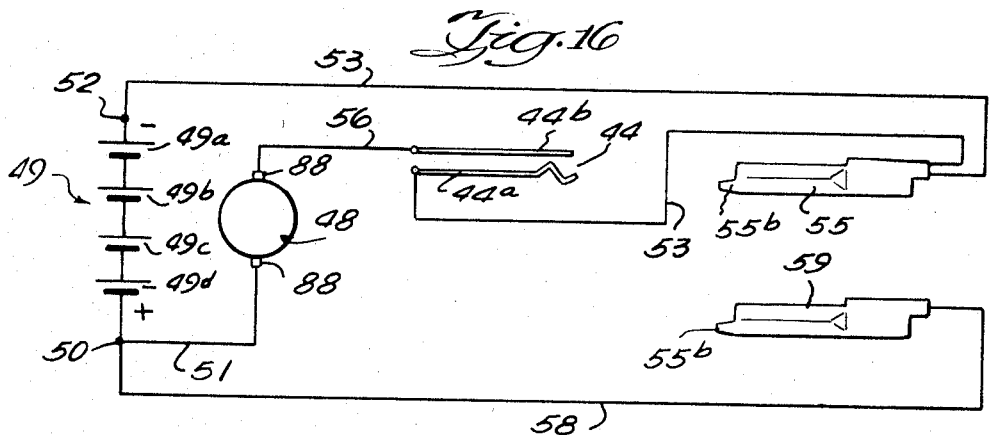
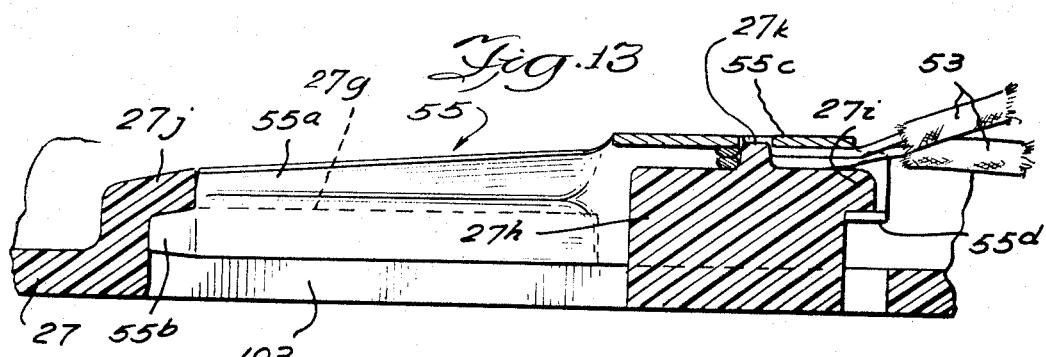
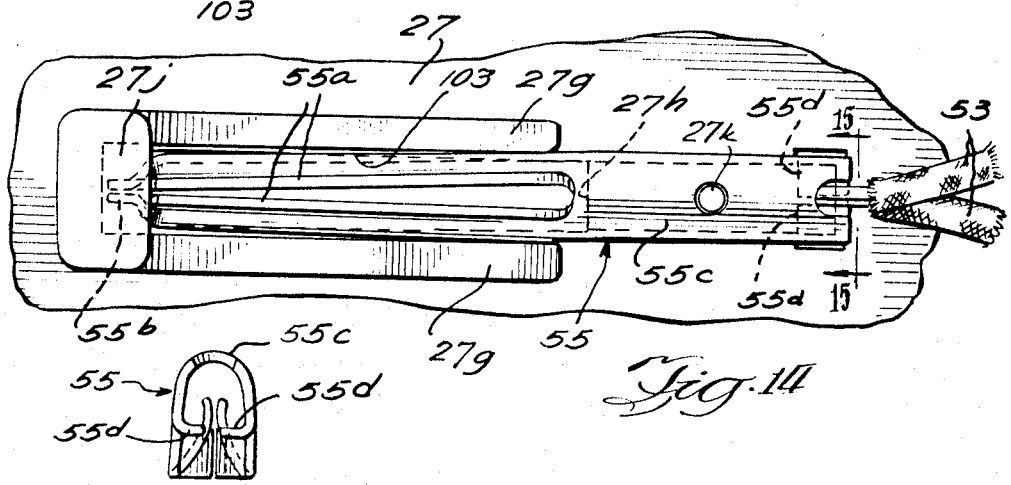

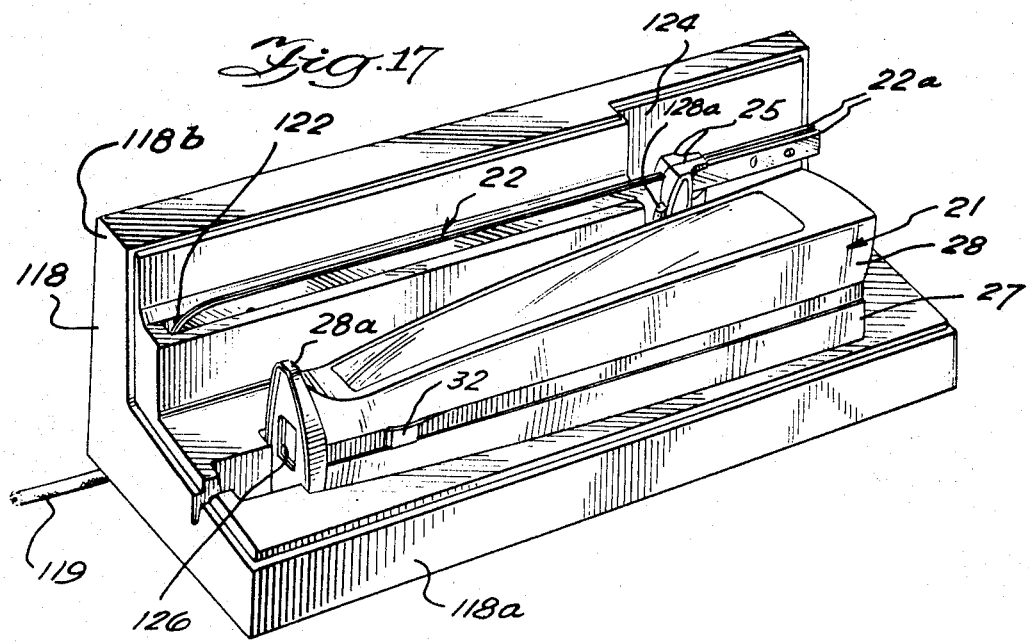
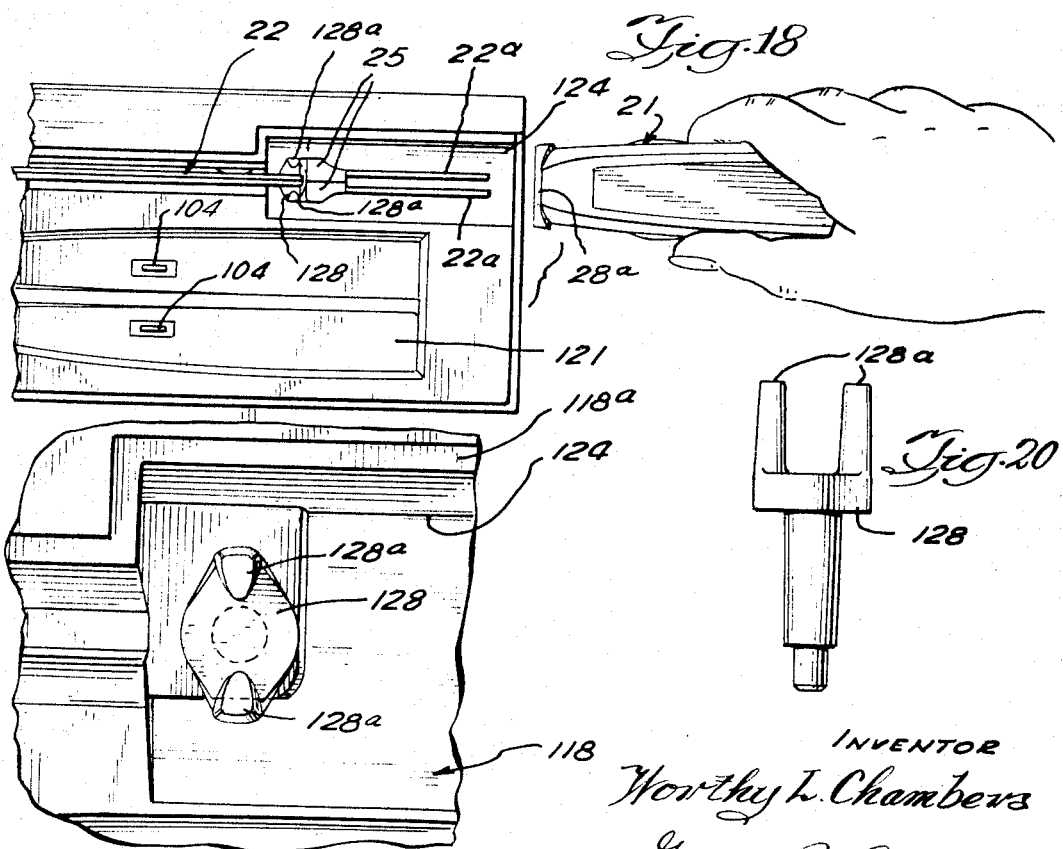
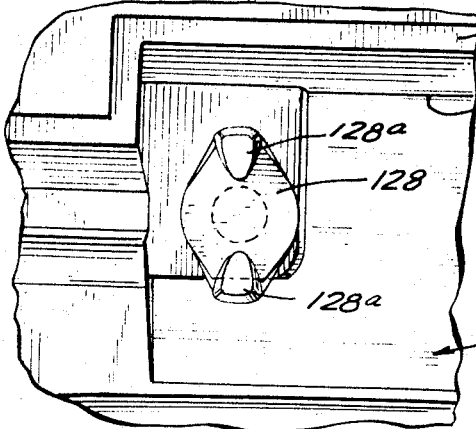
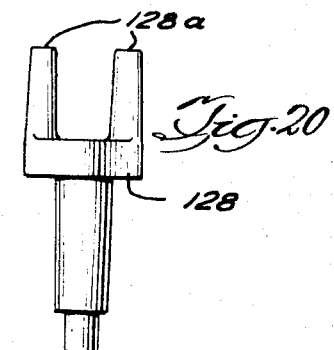

United States Patent Office 3,432,702
Patented Mar. 11, 1969

3,432,702
BATTERY POWERED ELECTRIC KNIFE
Worthy L. Chambers, Lombard, Ill., assignor to Sunbeam Corporation, Chicago, Ill., a corporation of Illinois
Filed Aug. 24, 1966, Ser. No. 574,648
U.S. Cl. 310—50         11 Claims
Int. Cl. H02k 7/14

ABSTRACT OF THE DISCLOSURE

A battery operated electric knife includes a two-part casing enclosing an electric motor and drive assembly for converting rotary motion of the armature shaft into reciprocal motion of a pair of blade holding members. A unitary frame member pivotally mounted to the casing supports the motor, a shaft bearing, and the drive assembly, and a spring engaging the motor holds these elements in place. A unit of rechargable batteries is connected to a charging unit in a storage cradle when the knife is stored by a pair of charging contacts recessed in the casing and accessable through openings adjacent the motor which also provide cooling air. Each charging contact includes resilient fingers for receiving a charging terminal, and a mounting portion resiliently encloses both a projection on the casing and a conductor connected to the battery unit.

---

The present invention relates to an electric knife and more particularly to a battery operated electric knife. Specifically, the present invention is an improvement on copending Cousins et al. application Ser. No. 532,261, filed Mar. 7, 1966.

Electric knives such as disclosed in the above-mentioned copending application have become very popular in recent years and are now extensively used. Many times it is desired to use an electric carving knife in a location where power can be supplied thereto only through a rather lengthy cord. It would be desirable, therefore, to provide a power operated electric knife which is battery powered whereby a power cord is unnecessary during a carving or slicing operation.

Most of the electric knives presently on the market comprise a pair of blades releasably secured together and reciprocated by a suitable electric motor contained in a power unit with the blades moving in sliding contact with each other. The blades are readily removable from the power unit for cleaning purposes and are securely attached thereto when used to perform a cutting operation. It is desirable to provide a power operated electric slicing knife which is light in weight, easy to manufacture and assemble, and wherein means are provided to readily recharge the batteries when the knife is not in use. Since a charging unit is necessary, it would be desirable to have such charging unit also support the blades, after they have been cleaned, in a manner that the user may readily secure the blades to the power unit without having to touch the blades during this securing operation.

Accordingly, it is an object of the present invention to provide a new and improved battery operated electric knife.

It is another object of the present invention to provide an electric knife which is simple and compact, easy to manufacture and assemble, foolproof in operation and capable of giving many years of satisfactory service to the user.

Still another object of the present invention is to provide an improved electric motor for driving the blades of an electric slicing knife.

A further object of the present invention resides in the provision of a lightweight electric knife which is properly balanced, easy to maneuver by the user, and which readily fits the user's hand and is comfortable to use even though it contains not only an electric motor but rechargeable batteries for energizing such motor.

A further object of the present invention resides in improved and compact mounting means for the power and drive mechanisms for an electric knife so as to permit ready assembly and disassembly and low manufacturing cost.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a perspective view of an electric knife embodying the present invention with the blades assembled to the power unit so as to be ready for a cutting or slicing operation;

FIG. 2 is an enlarged longitudinal sectional view taken substantially on line 2—2 of FIG. 1 showing primarily the power unit with only a small portion of the blades illustrated, and with certain portions cut away to aid in better illustrating the details of the slicing knife of FIG. 1;

FIG. 3 is a top plan view of the power unit with a portion of the top cover cut away more clearly to illustrate the present invention;

FIG. 4 is an enlarged fragmentary top plan view of the base portion defining the casing of the power unit with all elements of the slicing knife removed therefrom;

FIG. 5 is a greatly enlarged fragmentary sectional view taken on line 5—5 of FIG. 3 (also along line 5—5 of FIG. 4) more clearly to illustrate the mounting arrangement between the electric motor of the power unit and the casing housing the same;

FIG. 6 is a somewhat enlarged sectional view taken on line 6—6 of FIG. 2, assuming that FIG. 2 shows the complete structure;

FIG. 7 is an end view of one element of the electric motor best shown in FIGS. 2 and 6.

FIG. 8 is a view looking in the direction of the arrows 8—8 of FIG. 7;

FIG. 9 is an enlarged fragmentary sectional view taken on line 9—9 of FIG. 2, again assuming that FIG. 2 shows the complete structure;

FIG. 10 is a fragmentary top plan view with certain portions cut away of the commutator end of the electric motor employed in the electric knife of the present invention;

FIG. 11 is a fragmentary rear end view of the electric motor looking in the direction of the arrows 11—11 of FIG. 10;

FIG. 12 is an enlarged front end view of the electric motor and associated drive mechanism taken substantially on line 12—12 of FIG. 2, assuming that FIG. 2 shows the complete motor and drive structure;

FIG. 13 is a fragmentary sectional view taken on line 13—13 of FIG. 4 but assuming the charging contact and associated conductor is in assembled position in FIG. 4;

FIG. 14 is a top plan view of FIG. 13;

FIG. 15 is an end view of the charging contact looking in the direction of the arrows 15—15 of FIG. 14;

FIG. 16 is a schematic diagram illustrating the electric circuit of the electric knife of the present invention;

FIG. 17 is a perspective view of the charging and storage unit showing the electric knife of the present invention as it would normally be stored for recharging;

FIG. 18 is a fragmentary top view of the storage unit of FIG. 17 illustrating how the power unit may be associated with the blades of the electric knife without touching the blades;

FIG. 18 is a greatly enlarged fragmentary view of a portion of FIG. 17; and

FIG. 20 is an elevational view of one element shown in FIGS. 17, 18 and 19 of the drawings.

Briefly, the present invention is concerned with an electric knife including a two-part casing within which is mounted an electric motor and drive mechanism for converting rotary motion of the armature shaft of the electric motor to counter-reciprocating motion of a pair of blades disposed in intimate sliding contact with each other. Also mounted within the casing is a battery unit comprising a plurality of rechargeable batteries adapted to be readily connected to charging means and also adapted to energize the electric motor when desired. Improved means are provided for supporting the mechanism within the housing in a very simple manner, and a powerful battery energized electric motor is provided. Cooperating means on the motor and within the casing of the power unit of the electric knife serve to hold the parts in assembled relationship including simple means not only for supporting the charging contacts but for simultaneously completing electrical connections with such charging contacts.

A combined storage and charging unit is provided which is provided with a cradle portion to readily receive the power unit of the electric knife. By merely inserting the electric knife into the cradle portion, the charging circuit for the rechargeable batteries is completed. Additionally, the charging unit includes a storage section for the knife blades arranged so that the power unit may be attached to these blades while in the storage unit without touching the blades in assembling them to the power unit.

Referring now to the drawings, there is illustrated a power operated slicing knife comprising a power unit generally designated as 21 for reciprocating in sliding engagement with each other a pair of knife blades collectively designated as 22. The knife blades 22 form no part of the present invention and are preferably identical with those disclosed in the copending Cousins et al. application referred to above. No further description of the knife blades 22 is, therefore, included herewithin except to point out that the knife blades 22 are provided with rearwardly extending tang portions 22a, best shown in FIGS. 17 and 18 of the drawings, which are adapted to be received in suitable blade holders 24 (FIG. 2) which form no part of the present invention but are preferably identical with the blade holders disclosed and claimed in the above-mentioned Cousins et al. application. When the tank portions 22a of the knife blades 22 are inserted by longitudinal movement of the knife blades 22 into the blade holders 24, the blades 22 are latched in driving relationship with the power unit 21. As in the above-mentioned Cousins et al. application, the blades 22 are provided with guards 25 which again form no part of the present invention but preferably are identical with those disclosed in the above-mentioned Cousins et al. application.

Considering now the power unit 21 in more detail, it comprises a casing defined by a base member or base 27 and a cover or cover member 28 which are adapted to be secured together to define a hollow motor and battery chamber therein. To this end suitable screw-type fastening means 29 (FIG. 2) are adapted to extend through openings 30 (FIG. 4) in base member 27 to engage cooperating tapped openings 31 (FIG. 2) in cover member 28. To secure the front portions of members 27 and 28 together, the former is provided with integral interlocking projections 27a (FIG. 2) at the front end thereof receivable in suitable cooperating openings (not shown) defined through a projection or hilt portion 28a at the forward end of the cover member 28. Preferably the base 27 and the cover member 28 are each molded from a suitable plastic material. In assembling the cover member 28 to the base 27, the projections 27a are inserted into the openings defined in the hilt portion 28a, and then the rear of the cover member 28 is moved into cooperative engagement with the base 27 whereby the fastening means 29 can be inserted to hold the parts in assembled relationship.

In order to release the blades 22 from the power unit 21 once the two are assembled in operative relationship, a pair of blade release buttons 32 are provided, only one of which is shown in FIG. 1 of the drawings, the other being disposed on the opposite side but in the same position relative to the power unit 21. These blade release buttons 32 may be identical with those disclosed in the copending Cousins et al. application referred to above and form no part of the present invention. They are biased outwardly by a suitable U-shaped biasing spring 33, shown only in FIG. 2 of the drawings, which spring is preferably also identical to that disclosed in the above-mentioned Cousins et al. copending application.

It will be apparent that means must be provided to convert rotary motion of a conventional electric motor to counter-reciprocating motion of the pair of knife blades generally designated as 22. To this end there is included within the power unit a drive mechanism generally designated as 34 which forms no part of the present invention and preferably is identical with that disclosed in the above-mentioned Cousins et al. application. As best shown in FIGS. 2 and 12 of the drawings, this drive mechanism includes a molded one-piece assembly comprising a worm gear portion 34a, a pair of eccentrics (not shown) molded on the end faces of the gear 34a and drivingly receiving a pair of connecting rods 35 and 36. The connecting rods 35 and 36 are adapted to drive a pair of blade holders such as 24. The drive mechanism described forms no part of the present invention and is preferably identical with that disclosed in the above-mentioned Cousins et al. application. Moreover, as described in the above-mentioned Cousins et al. application, the gear 34a and eccentrics are molded onto a suitable shaft 37, the ends of which project beyond the connecting rods 35 and are receivable within suitable journals 38 and 39. Preferably the journals 38 and 39 are pressed onto the ends of the shaft 37 thus holding the gear 34a and integral eccentrics (not shown), the connecting rods 35 and 36, the shaft 37, and the journals 38 and 39 in assembled relationship in the same manner as described in the above-mentioned Cousins et al. application.

Also, as described in the above-mentioned Cousins et al. application, in order selectively to energize the electric motor of the power unit 21 described in detail hereinafter, there is provided a switch actuator or trigger 40 which is pivotally mounted to the forward end of the base portion 27 by means of an L-shaped spring 41, a suitable screw 42 securing one arm of the L to the end of the trigger. The trigger 40 is adapted to be actuated by the finger of the user so as to move the free end of a movable blade contact 44a into contacting engagement with the free end of a stationary blade contact 44b, the contacts 44a and 44b, defining a switch 44. As illustrated, the blade contacts 44a and 44b are supported in spaced parallel relationship on an integral projection 27b of the the base 27.

As illustrated in FIG. 2 of the drawings, a safety mechanism substantially identical with that disclosed in the Cousins et al. application is provided whereby the switch trigger 40 may be locked against accidental operation. To this end a cylindrical finger 45 is provided which is connected to the trigger 40 by an integral flexible portion 45a and suitable fastening means 46. The ends of the cylindrical finger 45 are adapted to engage a pair of spaced recesses defined in a pair of spaced downwardly directed projections 27c integrally molded with the base 27. The switch 44, the trigger 40, the safety means comprising the finger 45, etc. form no part of the present invention and are described merely to disclose an operative structure. They are preferably identical with the corresponding arrangement disclosed in the above-mentioned Cousins et al. application.

The power unit 21 of the present invention includes an electric motor generally designated as 48, best shown in FIGS. 2, 3, 6, 7, 8, 10, 11, 12 and 16 of the drawings, and a battery unit generally designated as 49, which are described in greater detail hereinafter. As best shown in FIG. 16 of the drawings, the battery unit 49 comprises a plurality of individual batteries 49a, 49b, 49c and 49d connected in series with the positive terminal 50 of the battery unit connected by a conductor 51 with the positive terminal of the motor 48. The negative terminal 52 of the battery unit 49 is connected by a conductor 53 to the movable switch terminal 44a of the switch 44. An intermediate portion of this conductor 53 is connected to one charging terminal 55 described in greater detail hereinafter. The stationary switch contact 44b in turn is connected by a conductor 56 to the negative terminal of the direct current motor 48. Additionally, the positive battery terminal 50 is connected by a conductor 58 to the negative charging terminal 59. It should be understood that the reference numerals employed in the schematic diagram of FIG. 16 are employed for corresponding parts in the other figures of the drawings.

Considering now the motor 48 best shown in FIGS. 2, 3, 6, 7, 8, 10, 11 and 12 of the drawings, it comprises a low voltage direct current motor which can be energized from rechargeable batteries, and specifically from the battery unit 49 referred to above. As illustrated, the motor 48 comprises a cylindrical outer shell 60 having a longitudinally extending slit 61 extending from end to end of the shell whereby the shell 60 might be characterized as a split shell. In order to orientate the other motor parts relative to the shell 60, the ends of the latter are provided with a pair of aligned notches 62 in the ends thereof (FIG. 8), which aligned notches are positioned diametrically opposite the slit 61. The shell 60 has sufficient inherent resilience to tend to close the slit 61 as shown in FIG. 6 of the drawings. When the shell is assembled, as described in detail hereinafter and as shown in FIG. 6 of the drawings, the slit 61 is increased in width. Disposed immediately within the shell 61 and in intimate contact therewith is a sheet of molded material 64, preferably formed of barium ferrite or the like, which is commonly termed a flexible permanent magnet. Disposed inside the magnet 64 are a pair of diametrically opposed pole shoes 65 and 66. The inherent resilience of the outer shell 60 tends to make good contact between the shell 60 and the magnet 64, and also between the magnet 64 and the pole shoes 65 and 66, which is important. As illustrated in FIG. 6 of the drawings, the slit 61 in the outer resilient shell is disposed in alignment with the center of one of the pole shoes (specifically pole shoe 66), and the slit defined between the ends of the magnet 64, designated as 67, is disposed at an angle of 90° relative to the slit 61.

In order to define an accurate air gap between the pole shoes 65 and 66 and the armature 69 of the motor 48 in a simple and inexpensive manner, a pair of molded motor end members 70 and 71 are provided. These members may be molded from a suitable plastic material. The end member 70 is designated as the commutator end member, while the end member 71 is designated as the drive mechanism end member. Each of the end members 70 and 71 is provided with a projection having accurately formed external cylindrical surfaces to engage and accurately position the inner corresponding arcuate surfaces of the pole shoes 65 and 66 thereby defining by a simple manufacturing process without any machining a very accurate air gap between the armature 69 and the pole shoes 65 and 66. It will be understood that the inherent resilience of the outer shell 60 in tending to close the slit 61 clamps the magnet 64, which in turn forces the pole shoes 65 and 66 into clamping engagement with the projections on members 70 and 71 having accurately formed external cylindrical surfaces, thus accurately determining the air gap and at the same time insuring good contact between the clamping sleeve 60 and the cylindrical flexible magnet 64, and also between the magnet 64 and the pole shoes 65 and 66 thereby maintaining the magnetic reluctance of the magnetc circuit of the motor 48 as low as possible. Specifically, and to this end, end member 70 is provided with a discontinuous cylindrical projection 70a having a pair of diametrically opposed notches (not shown) defined therein. This projection 70a has portions engaging the pole shoes 65 and 66, as clearly shown in FIG. 2 of the drawings. Similarly, end member 71 is provided with a cylindrical projection 71a engaging the pole shoes 65 and 66, as shown in FIG. 2.

For the purpose of angularly spacing the pole shoes 65 and 66 trom each other, as shown in FIG. 6 of the drawings, each of the projections 70a and 71a is provided on the cylindrical surfaces referred to above with diametrically disposed radial projections receivable in the gaps between the pole shoes 65 and 66, only portions 71f of the projection 71a being clearly visible in FIG. 6 of the drawings. Also, end member 71 is provided with a projection 71g receivable in one of the notches 62 in the ends of sleeve 61 as shown in FIG. 8. A similar projection is provided on end member 70 to engage the other notch 62. With the above described arrangement the parts of the motor stator and end members are properly orientated initially during the assembly operation and remain so. Also, as illustrated, the end member 70 includes an annular portion 70b for mounting therein a bearing 72 to support the commutator end of an armature shaft 73 upon which is supported the armature 69. Similarly, the end member 71 is provided with an annular portion 71b for supporting a ball bearing assembly 74 thereby to rotatably support the other end of the armature shaft 73.

In accordance with the present invention, end member 71 also functions as a mounting means for the drive mechanism and, to this end, is provided with an integral forwardly extending U-shaped projection 71c best shown in FIGS. 2, 3, 5 and 12 of the drawings. This projection 71c is open at the top and open at the front end, which is the end most remote from the annular portion 71b of end member 71. Moreover, the projecting end of armature shaft 73 extends into the upper part of the chamber formed by the U-shaped projection. The bight of the U-shaped projection 71c is disposed closely adjacent the base member 27, while the sides of the U-shaped projection 71c extend upwardly on either side of drive mechanism 34, as best shown in FIG. 12 of the drawings. To support the journals 38 and 39, these side portions are recessed to provide journal receiving grooves 77 and 78 (FIGS. 5 and 12) to receive therein the journals 38 and 39. With this arrangement the drive mechanism 34, comprising the worm gear 34a, the integrally molded eccentrics on either face thereof, the connecting rods 35 and 36, and the shaft 37 to which the journals 38 and 39 are press fitted, is inserted into the open front end of U-shaped projection 71c, with the journals 38 and 39 inserted into the grooves 77 and 78, respectively. To hold the drive mechanism in position, suitable bearing retainers 80 are provided, the ends of which bite into the walls defining the upper and lower edges of the grooves. As illustrated, the side walls of the boxlike projection 71c defining the grooves 77 and 78 are provided with rectangular recesses 81 (FIGS. 5 and 12) to receive a suitable thrust pad 82 engageable by one end of shaft 37 to take the end thrust thereof.

In order that the motor 48 is drivingly related to the drive mechanism 34, the armature shaft 73 extends into the chamber defined by the U-shaped projection 71c and is provided with a suitable worm 83 which overlies worm gear 34a and meshes therewith.

The end member 70, best shown in FIGS. 2, 3, 10 and 11 of the drawings, includes the annular portion 70b mentioned above for supporting the bearing 72, which bearing is held in position by a suitable bearing retainer 85. The bearing retainer 85 is an annular member having a pair of diametrically opposed projecting ears 85a (FIG. 11). The annular portion 70b of end member 70 is provided with diametrically opposed openings 86 to permit the insertion therein of the ears 85a of bearing retainer 85. These ears are insertible into annular portion 70b by virtue of the discontinuities referred to above in the projections 70a, the ears being adapted to extend into the space provided by these discontinuities during the assembly operation. After the retainer 85 has been moved into retaining engagement with bearing 72, it is rotated through a slight angle from its position with ears 85a in openings 86 to the position shown in FIG. 11 of the drawings thereby to retain the bearing 72 in position without any additional fastening means.

As best shown in FIGS. 2 and 10 of the drawings, a commutator 87 is supported on shaft 73 within the end member 70, and suitable commutator brushes such as 88 are longitudinally movable in cooperating recesses 89 defined at diametrically opposed positions in end member 70. Suitable springs 90 bias the brushes into contacting engagement with the commutator 86. As best shown in FIG. 16 of the drawing, conductors 51 and 56 are electrically connected to the brushes 88. To permit ready access to the brushes 88 and the springs 90, removable brush clips 92 are provided which are sort of fork-shaped members which slidably engage projections 70d on the end member 70.

In order to hold the end members 70 and 71 in assembled relationship with the concentrically disposed sleeve 60, flexible magnet 64 and pole shoes 65 and 66, there are provided a pair of clamp members 94, best shown in FIGS. 3, 6, 10, 11 and 12 of the drawings, which are disposed outside sleeve 60 in diametrically opposed positions and which clamp the end members to sleeve 60. These clamp members 94 each include a hook-shaped end 94a for engaging a suitable opening such as 95 (FIGS. 6 and 12) in end member 71, while the other end of each clamp is provided with a latching portion 94b (FIGS. 10 and 11) for engaging with a suitable depression 96 in the end member 70 (FIG. 11).

For the purpose of securing the motor 48 in position within the base member 27 in a simple and inexpensive manner, the base member 27 is provided toward its forward end with a pair of spaced elongated openings 97 (FIGS. 4 and 5). These openings are surrounded by upwardly directed wall portions 27d (FIGS. 4 and 5) integrally formed with base member 27. Overlying the forward end of each opening 97 is a somewhat hook-shaped portion 27e, the underside of which is level with the top of wall portions 27d. Integrally molded with end member 71 and depending in spaced parallel relationship from the underside of the bight portion of projection 71c are a pair of rail portions 71d of a width so as to slidably fit within openings 97. Rail portions 71d include end portions projecting forwardly of the bight portion of projection 71c to be received beneath hook-shaped portions 27e as best shown in FIG. 5 of the drawings. Moreover, the underside of the bight portion of projection 71c rests on the top of wall portions 27d thus firmly securing the motor 48 against movement relative to base portion 27 other than upward movement of the commutator end thereof pivoted about the hook-shaped portions 27e. In order to hold down the commutator end of the motor against such pivotal movement, there is supported in cover member 28 a motor anchor spring 98 (FIGS. 2 and 6) supported by projecting fingers 28b integrally formed with cover member 28. When the members 27 and 28 are secured in assembled relationship, as shown in FIG. 6 of the drawings, the anchor spring 98 is distorted by engagement with sleeve 60 of the motor 48 thereby securely to hold the rear end of motor 48 against movement. Thus there has been provided a simple and inexpensive arrangement for holding the motor 48 in place which is particularly advantageous from an assembly and disassembly standpoint.

To hold the conductors such as 53, 56 and 58 in posi-tion, the end member 70 is provided with a narrow upwardly directed flange 70c having spaced notches 99 and 100 (FIGS. 3 and 10) defined therein. Similarly, end member 71 is also provided with a narrow upwardly directed flange 71e (FIGS. 3 and 12) having spaced notches 101 and 102 therein, the notches 100 and 102 being in alignment and receiving conductors 53 and 56 therein, and the notches 99 and 101 being in alignment and receiving conductor 58 therein.

In accordance with the present invention, the charging contacts 55 and 59 are of a construction so as to readily cooperate with the base member 27 and not only be positioned in proper position to cooperate with an associated charging unit described hereinafter but also readily to complete electrical connections with conductors 53 and 58 in a simple manner. The charging contacts 55 and 59 are best shown in FIGS. 2, 3, 6, 13, 14, 15 and 16 of the drawings. In order to provide a simple means for assembling these contacts with the base member 27, the latter is provided with a pair of contact receiving openings 103 (FIGS. 4 and 6) in the underside thereof, which openings on the side within the casing defined in part by base member 27 are partially surrounded by an upstanding U-shaped wall portion 27g. Adapted to be received through the openings 103 are male-type charging contacts designated as 104 and shown in FIG. 18 of the drawings. The charging contacts 55 and 59 are identical and hence only one will be described in detail, namely, the charging contact which is shown in FIGS. 2, 3, 13, 14 and 15 of the drawings. As best shown in the drawings, this charging contact comprises a folded over conducting member having a pair of forwardly directed spring fingers 55a terminating at the free ends of the fingers with a narrow portion 55b. These fingers 55a are resiliently biased toward each other so as to make good electrical contact with the contacts 104 associated with a storage charging unit when inserted therebetween. The fingers 55a on the underside thereof, as viewed in FIG. 13 of the drawings, diverge apart at the lower edge to insure ready insertion of the male-type charging contacts 104. The ends of the fingers 55a remote from the narrow projections 55b are secured to a U-shaped portion 55c which is adapted to receive between the legs thereof a projection 27h (FIGS. 4 and 13) disposed adjacent the forward end of each opening 103. The projections 27h are integrally formed with the base member 27 and include at the forward end thereof, as best shown in FIG. 13, a forwardly directed narrow projection 27i. In order to cooperate with projection 27i, charging contact 55 includes at the end of U-shaped portion 55c remote from fingers 55a a clamping portion 55d, best shown in FIG. 15, which is adapted to almost completely surround projection 27i. In assembling the charging contact 55 to the base portion 27, the bight portion 55c is positioned to receive the projection 27h therein with the spring fingers extending into the openings 103 defined between wall portions 27g. The wall portion 27g is somewhat U-shaped with the portion thereof remote from projection 27h overlying the end of the opening 103. This overlying portion is designated as 27j, best shown in FIGS. 4 and 13 of the drawings. With the charging contact 55 in the inserted position, it is slid to the left as viewed in FIG. 13 of the drawings until the narrow projections 55b are underneath the overhang 27j and also the clamping portion 55d engages the projection 27i.

In order to simultaneously complete the electrical connections with charging contacts 55 and 59, the top surface of projections 27h are V-shaped so that a conductor may be received therein, and at the center of the V-shaped portion is a slight projection 27k. It will be understood that an intermediate portion of conductor 53 will be inserted in the V-shaped portion of one of the projections 27h before the charging contact 55 is placed in position, whereupon the conductor will be clamped between the portion 55c of the charging contact 55 and the V-shaped surface of the cooperating projection 27h, the projection 27k insuring that the conductor will not be pulled out. The same assembly operation is performed with respect to charging contact 59 except that one end of conductor 58 is placed in the V-shaped top of associated projection 27h. With this arrangement it is apparent that a very simple assembly operation is involved in mounting the charging contacts in base member 27 and simultaneously making electrical connection with the conductors 53 and 58.

As best shown in FIG. 4 of the drawings, the base member 27 includes integrally formed cross rib portions, such as 27m, 27n and the like, which provide rigidity and support. In order that electrical connections can readily extend beneath the motor 48 to the switch 44 mounted at the forward portion of the motor and particularly to accommodate leads 53 and 56, the rib portions, such as 27m and 27n, are provided with notches such as 106 and 107, best shown in FIGS. 2 and 4 of the drawings.

Referring now to the battery unit 49, it comprises a battery rack 110 preferably formed of a molded material so as to provide four compartments for rechangeable nickel cadmium cells 49a, 49b, 49c and 49d, as best shown in FIGS. 2, 3 and 9 of the drawings. As was mentioned earlier and as is clearly illustrated in the schematic diagram of FIG. 16 of the drawings, these batteries are connected in series. To this end and as best shown in FIG. 9 of the drawings, a conducting strip 111 connects the positive terminal of battery 49a to the negative terminal of battery 49b. Likewise, a conducting strip 112 connects the positive terminal of battery 49c to the negative terminal of battery 49d. At the other end of the cells, not shown in the drawings, the positive terminal of battery 49b is connected to the negative terminal of battery 49c by a similar suitable conducting strip. Preferably strips 111, 112, etc. are soldered directly to the cell terminals. Thus the negative terminal of battery 49a becomes the terminal 52 of the battery unit and the positive terminal of battery 49d becomes the positive terminal 50 of the battery unit, as clearly shown in FIG. 16 of the drawings, and these terminals are connected as already described in connection with FIG. 16 of the drawings. Preferably, the base portion 27 to the rear of the openings 30 is provided with a pair of spaced concavities 115 (FIGS. 4 and 9) to receive therein the lowermost cells 49b and 49c.

Referring now to the charging and storage unit, best shown in FIGS. 17, 18, 19 and 20, it comprises a somewhat L-shaped housing 118 having a base portion 118a and an upstanding wall portion 118b. Within the portion 118a is mounted a suitable transformer and rectifier unit, whereby electric power supplied to the unit 118 through power cord 119 may be converted to low voltage direct current supplied to the contacts 104 (FIG. 18). The upper surface of base portion 118a of the charging unit 118 defines a cradle including a recess 121 shaped to receive the power unit 21 therein, as best shown in FIG. 17 of the drawings. When the power unit is placed into the recess 121 as shown in FIG. 17 of the drawings, the charging contacts 55 and 59 thereof are electrically engaged with the contacts 104 in a manner readily apparent to those skilled in the art.

In order to store the blades 22 in the charging unit 118, the upstanding rear portion 118b is provided with a narrow elongated blade receiving recess 122 so that substantially all of the blades 22, except for the guards 25 and tang portions 22a, are received therein. The rear of the upstanding wall portion 118b is recessed as indicated at 124, so that the user may readily grasp the power unit 21, as shown in FIG. 18 of the drawings, and move it toward the tangs 22a so that not only are the tangs received in the opening 125 in hilt portion 28a but the tang portions are received into latching engagement with the blade holders 24. The operator can then remove the assembled power unit 21 and blades 22 without having to touch the blades, they being retained in the narrow slot 122 during this assembly operation.

It will be understood that the blade holders 24 will be in various relative positions in the power unit 21 when it is desired to assemble the power unit with the blades 22, and to this end there is provided a blade stop 128 (FIGS. 18, 19, and 20) pivotally mounted in the recess 124. This blade stop has a pair of upwardly extending fingers 128a to receive therebetween the blades 22. These fingers are engageable by the guards 25 so that whichever blade holder first engages the cooperating knife blade it will pivot the blade stop 128a and cause the other finger to position the other blade in the same relative position as the other blade holder.

To highlight some of the less obvious advantages of the invention reference will be made back to some of the structural details and the advantages associated with them. The construction and organization of the electric motor 48 and the drive mechanism 34 with the housing provides significant manufacturing economies while also producing functional advantages. By supporting the drive mechanism on an integral extension on the motor end member 71, there is provided an arrangement in which the important tolerances between the armature shaft and the drive mechanism may be easily and accurately maintained.

Since the tolerances between the drive mechanism and the blade holders are not too critical because of their being drivingly related by connecting rods, the base member 27 which supports the various elements of the knife may be made of a fairly light, inexpensive plastic material.

It should also be noted that the bearing used in the end member 71 is a ball bearing 74 which also receives the thrust forces delivered to the armature shaft. By having the thrust bearing 74 included in the end member which also supports the drive mechanism, the tolerance problems are further reduced.

With respect to the arrangement of the charging contacts 55 and 59 within the housing of the power unit 21, it should be appreciated that the contacts 55 and 59 are completely out of sight and substantially inaccessible by normal means as positioned therein. As a consequence, the male charging terminals must extend a substantial distance to enter the housing and make contact with the charging contacts. Since an electric knife is frequently used in the kitchen where food and silverware are present, it is important to have the contacts recessed in this manner. Otherwise food may corrode the contacts and prevent good engagement for charging and inadvertent engagement of the contacts with silverware could result in discharge of the batteries. Accordingly, the recessed terminals have many advantages from an esthetic and a functional standpoint.

In view of the detailed description included above, the operation of the electric knife of the present invention will readily be understood by those skilled in the art and no further description is included herewith. Moreover, while there has been illustrated and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. A battery operated electric knife comprising a cover member and a base member forming an elongated housing, a battery unit positioned in said housing at one end thereof, a pair of knife blade holders supported for reciprocating movement within said housing at the other end thereof, a motor and drive mechanism assembly supported on said base member between said battery unit and said blade holders, said motor having an armature shaft drivingly connected to said drive mechanism which converts rotary motion of said shaft into reciprocating movement, a pair of connecting rods drivingly connecting said drive mechanism and said blade holders, said assembly including a frame member for supporting one end of said motor and said drive mechanism, interlocking projections on said frame member and said base member to pivotally connect one end of said assembly to said base member, and resilient retaining means bearing on the other end of said motor to urge said motor against said base member.

2. The electric knife of claim 1 wherein said resilient means is carried by and urged into bearing engagement with said motor by said cover member.

3. An electric knife comprising an elongated housing, a pair of knife blade holders supported within said housing for reciprocating movement, a motor having an armature shaft and a permanent magnet field assembly, a bearing means supporting said armature shaft and said knife blade holders for reciprocating said holders in response to rotary movement of said armature shaft, an integrally molded plastic frame member having a motor supporting portion engaging said field asesmbly, said frame member having a bearing supporting portion supporting said bearing means at an accurately located position with respect to said field assembly, said frame member having a drive assembly supporting portion mounting said drive assembly for operation by said armature shaft, a first retaining means on said housing, a cooperating second retaining means on said frame member cooperating with said first retaining means to pivotally mount said frame member, motor, bearing and drive assembly on said housing, and resilient means bearing on said motor for holding said first and second retaining means in engagement with one another.

4. The battery operated electric knife of claim 1 wherein said motor includes a stator and a pair of bearings supporting said armature shaft, said frame member comprises an integrally molded piece having a motor supporting portion which supports one end of said stator and one of said armature bearings, a U-shaped projection on said motor supporting portion extending away from said motor, said projection having a pair of opposed journal receiving grooves in opposite walls thereof, a worm gear having oppositely disposed eccentrics mounted on each face thereof, bearing means for said worm gear and eccentrics received in said grooves, and retaining means in said grooves engaged with said bearing means to prevent their outward displacement.

5. The battery operated knife of claim 1 wherein said frame member comprises one of two molded end members, said motor having a cylindrical permanent magnet stator and a pair of armature bearings supporting said armature shaft, each of said end members supporting one of said armature bearings and engaging one end of said permanent magnet stator, projections molded on said end members to locate accurately said bearings with respect to the inside diameter of said stator, and clamp members extending axially of said motor and engaging said end members to clamp them axially against the ends of said stator.

6. A battery operated appliance comprising an elongated housing having a battery unit at one end, a motor and drive mechanism intermediate the ends, and a pair of reciprocally driven tool holders at the other end; said motor having an armature shaft drivingly connected to said drive mechanism which converts rotary motion of said shaft into reciprocating movement; a pair of connecting rods drivingly connecting said drive mechanism and said tool holders; said motor having a cylindrical permanent magnet stator and a pair of armature bearings supporting said armature shaft; said motor having a pair of molded end members engaging opposite ends of said cylindrical stator and each supporting one of said bearings; projections molded on said end members to locate accurately said bearings with respect to the inside diameter of said stator; means clamping said end members against said stator to form a unitary motor assembly; and integrally formed mounting means projecting outwardly from one of said end members for supporting said drive mechanism; said mounting means having bearing recesses formed therein to support the bearings for said drive mechanism.

7. The battery operated appliance of claim 6 wherein said motor and drive mechanism is supported within said housing by means of integrally formed projections on said mounting means which engage a cooperating recess means in the lower wall of said housing, and resilient means within said housing engaging the end of said motor remote from said drive mechanism to restrain said motor and drive mechanism against displacement within said housing.

8. The battery operated appliance of claim 6 wherein said drive mechanism includes a worm gear with a pair of eccentrics on each face thereof rotatable about an axis transverse to said armature shaft, and bearing means for said worm gear and eccentrics, said bearing means being supported in said bearing receiving recesses, said armature shaft having formed on one end a worm in driving engagement with said worm gear.

9. The battery operated appliance of claim 8 wherein said bearing receiving recesses comprise outwardly opening slots in which said bearing means are received, and bearing retainers received in said slots to restrain said bearing means against outward movement in said slots.

10. A rechargeable battery operated electric knife comprising a housing formed by a cover member and a base member which assemble to provide an elongated enclosure, battery means supported by said base member at one end of said enclosure, a low voltage motor and transmission means supported on said base member adjacent said battery means, a manually operable switch carried by said base member, means electrically connecting said battery means in series with said switch to said motor, a pair of charging contacts connected to said battery means to permit recharging said battery means from an external low voltage source of direct current, each said charging contact having a pair of closely spaced elongated resilient fingers extending from a mounting portion, integral projections on the interior of said base member, said mounting portion of each said contact being formed to resiliently clamp into assembled relation with one of said projections, said contacts gripping between said mounting portion and said projections conductors connected to said battery means, said base member being formed with openings aligned with said fingers to permit male charging terminals to be inserted into said housing into engagement with said contacts.

11. The rechargeable battery operated electric knife of claim 10 wherein said openings in said base are positioned under said motor to provide circulation of cooling air into said housing, said charging contacts being positoned entirely within said housing.

References Cited

UNITED STATES PATENTS

| | | | |
|---|---|---|---|
| 3,196,299 | 7/1965 | Kott | 310—68 |
| 3,120,056 | 2/1964 | Gerry | 30—272 |
| 3,203,096 | 8/1965 | Beisheim | 310—50 |
| 3,300,664 | 1/1967 | Boyles | 310—80 |
| 3,307,259 | 3/1967 | Christensen | 30—272 |
| 3,308,536 | 3/1967 | Freedman | 30—272 |
| 3,337,954 | 8/1967 | Robinson | 30—272 |

J. D. MILLER, *Primary Examiner.*

U.S. Cl. X.R.

30—272; 200—51.09; 206—16; 310—80, 68